Patented June 26, 1923.

1,459,971

UNITED STATES PATENT OFFICE.

CARNIE B. CARTER, OF PITTSBURGH, PENNSYLVANIA, AND ALBERT E. COXE, OF CHICAGO, ILLINOIS, ASSIGNORS, BY MESNE ASSIGNMENTS, TO S. KARPEN & BROS., A CORPORATION OF WEST VIRGINIA.

PROCESS OF PRODUCING ESTERS.

No Drawing.  Application filed November 13, 1920.  Serial No. 423,870.

*To all whom it may concern:*

Be it known that we, CARNIE B. CARTER, a citizen of the United States, residing at Pittsburgh, in the county of Allegheny and State of Pennsylvania, and ALBERT E. COXE, a citizen of the United States, residing at Chicago, in the county of Cook and State of Illinois, have invented a new and useful Improvement in Processes of Producing Esters, of which the following is a specification.

The present invention pertains particularly to the art of producing esters, which may either form articles of commerce, or which may be used in the manufacture of alcohol.

An important object of the invention is to provide a readily available source for the manufacture of methyl alcohol at moderate cost, it being well understood at the present time that wood alcohol is expensive and the sources of supply are becoming more and more limited. As is well known, formaldehyde and hexamethylenetetramine, which are required in large quantities in the manufacturing arts, are obtained chiefly from wood alcohol, by passing the same over a heated catalyzer. Formaldehyde and hexamethylenetetramine are at the present time expensive, inasmuch as wood alcohol is now depended upon as the source of supply.

A further object is to provide a desirable method of manufacturing esters which can be readily and cheaply converted into alcohols, and certain of which are in immediate demand, as such, for various purposes.

Generally stated, the improved process involves the production of esters by causing a halogenated hydrocarbon of the aliphatic series to react upon a metallic salt of an acid in the presence of a solvent, the reaction being preferably performed under the influence of heat and pressure and the solvent being preferably an aqueous solvent comprising alcohol. The pressure employed may, however, be created by carrying out the reaction in a closed vessel.

The following example will serve to indicate the process:

Saturate 30 cubic centimeters of a solvent, such as alcohol, with a halogenated hydrocarbon of the aliphatic series, such as methyl chloride, the alcohol being capable of taking up thirty or forty times its volume of methyl chloride; place the solution in a glass tube; add a sufficient quantity of a metallic salt of an acid, such as sodium acetate, to combine with the methyl chloride; seal the tube hermetically and heat in an oil bath at 100° C., or higher; and continue heating until the deposition of salt (NaCl) is complete. Chemical reaction begins promptly upon the application of heat, and after about thirty minutes the deposition of sodium chloride in the bottom of the tube commences. At the temperature stated, the action is complete after six to eight hours of application of heat, by which time about eighty per cent of the methyl chloride has reacted with the sodium acetate. As the methyl chloride is consumed in the reaction, apparently the pressure, which is automatically produced by the heating operation, subsides to the point where the reaction slows up or ceases. If a fresh supply of methyl chloride be introduced, and the heating continued in a closed tube, fresh reaction will occur; and, ultimately, the sodium acetate will all, or practically all, enter into the reaction, assuming a sufficient supply of methyl chloride to maintain sufficient pressure to keep enough of the methyl chloride in solution to react on the sodium acetate present. Obviously, under the conditions stated, the pressure will vary and in the end will become quite low, probably only a very few pounds.

It is not essential that the alcohol be of a high degree of concentration. In fact, the reaction proceeds better, apparently, if a considerable amount of water be present. For example, the solvent may be in the proportions of fifty per cent alcohol and fifty per cent water, and a much smaller percentage of alcohol may be employed under proper conditions. The percentage of alcohol may be reduced to a very small proportion, say five or ten per cent of the solvent, provided means are employed to maintain a constant saturation of the alcohol present by methyl chloride. The water aids in placing the sodium acetate in solution, thus favoring the reaction.

In practice, the reaction may be carried on in an autoclave. The product of the example given above is methyl acetate, with sodium chloride as a by-product. Methyl acetate is itself a solvent for methyl chloride, and may be employed in lieu of alcohol.

Thus, the process may be practiced in an autoclave as follows:

Place in the autoclave a quantity of methyl acetate and water; introduce a quantity of sodium acetate; heat the autoclave; pump in methyl chloride until all the sodium acetate enters into the reaction; draw off the methyl acetate, and filter, after cooling, to separate the sodium chloride from the solution; expel from the autoclave the salt deposited therein. The operation may then be repeated.

If alcohol be used as a solvent, it may be separated from the methyl acetate by fractional distillation. Many other solvents may be used, and fractional distillation may be employed to effect separation. Whatever solvent may be employed, it is highly desirable that water be present, or form a part thereof.

The reaction proceeds more rapidly if a temperature higher than 100° C. be employed. For example, if the reaction be carried on in a test tube, under the conditions stated above, at a temperature of 150° C., the reaction begins at once, and the deposition of salt in the bottom of the test tube is immediately evident. The reaction, under such temperature, will be completed within a period of five or ten minutes to a point where practically all of the methyl chloride has entered into reaction with the sodium acetate.

Where a considerable proportion of water is employed in the alcohol, the reaction is quicker than where alcohol of a high degree of concentration is employed.

The methyl acetate obtained according to the examples given above is an ester, or alkyl salt, which may be treated to obtain methyl alcohol and sodium acetate by reaction with an alkali. The saponifying operation may be performed at room temperature or by boiling, under pressure, methyl acetate with sodium hydrate, the reaction proceeding in accordance with the following equation:

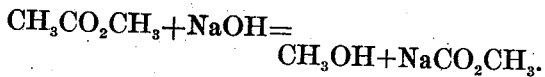

$$CH_3CO_2CH_3 + NaOH = CH_3OH + NaCO_2CH_3.$$

Thus, there are obtained methyl alcohol ($CH_3OH$) and sodium acetate ($NaCO_2CH_3$). The sodium acetate thus obtained may be employed in producing more methyl acetate, from which it appears that the raw materials employed in the process may be mainly methyl chloride and sodium hydrate, inasmuch as the only original supply of sodium acetate necessary is a sufficient quantity to effect the first reaction and supply, from time to time, such losses as may occur in the manufacture. In other words, the main source of supply of sodium acetate employed in the process may be obtained from the practice of the process itself.

Not only is the presence of water in the solvent desirable from the standpoint of facilitating the solution of the metallic salt of an acid employed and facilitating the reaction, but the feasibility of employing a hydrous solvent is of great value in the economical operation of the process. Thus, for example, the sodium acetate recovered in the operation of hydrolyzing methyl acetate will contain water, and it is unnecessary to render this sodium acetate anhydrous before employing it in the continued practice of the process. In fact, one may distil off the alcohol produced by the saponifying operation, leaving only the desired proportion for solvent purposes, and then introduce the requisite amount of methyl chloride and continue the process of producing methyl acetate.

Any desired halogenated hydrocarbon of the aliphatic series may be employed in lieu of methyl chloride. Examples of halogenated hydrocarbons of the aliphatic series which may be employed are as follows:

Methyl chloride ($CH_3Cl$).
Ethyl chloride ($C_2H_5Cl$).
Methylene chloride ($CH_2Cl_2$).
Isobutyl chloride ($C_4H_9Cl$).
Ethylene chloride ($C_2H_4Cl_2$).

In the same way the iodides and bromides, belonging to the halogenated hydrocarbons of the aliphatic series, may be used. Examples are:

Methyl iodide ($CH_3I$).
Methyl bromide ($CH_3Br$).

It will be noted that the examples of halogenated hydrocarbons of the aliphatic series given above are esters of inorganic acids.

Of the examples given above, the methane derivatives mentioned are preferred. These substances, which include methyl chloride, methylene chloride, methyl iodide, and methyl bromide, are examples of a halogenated methane having less than three halogen atoms. They enter more rapidly into reaction than the higher halogenated hydrocarbons of the aliphatic series, as, for example, isobutyl chloride. Furthermore, in the use of such a substance no olefins will form when water is present in the solvent employed, and the entire reaction is a useful reaction, resulting in the desired ester. Of the methane derivatives, the use of methyl chloride is preferred, because this compound may be obtained cheaply and in abundance and because the process of esterification may be more economically performed. Moreover, the product is readily converted directly into methyl alcohol, for which there is great demand.

Any desired metallic salt of an acid may be employed in lieu of sodium acetate. Metallic salts of organic acids are preferred, and of the metallic salts of organic acids, those of the aliphatic series are preferred.

Examples of metallic salts of organic acids of the aliphatic series, which may be employed, are as follows:

Sodium acetate ($NaCO_2CH_3$).
Sodium oxalate ($Na_2C_2O_4$).
Sodium formate ($NaCO_2H$).
Sodium butyrate ($NaCO_2C_3H_7$).
Calcium acetate ($Ca(CO_2CH_3)_2$).
Potassium acetate ($KCO_2CH_3$).

Examples of metallic salts of organic acids of the aromatic series which may be employed are as follows:

Sodium benzoate ($NaCO_2C_6H_5$).
Sodium salicylate ($NaCO_2C_6H_4OH$).

Examples of metallic salts of inorganic acids which may be employed are as follows:

Sodium iodide (NaI).
Sodium bromide (NaBr).

Further examples of reactions, which may be effected in accordance with the process set forth above, in which a halogenated hydrocarbon of the aliphatic series is caused to react upon a metallic salt of an acid in the presence of a solvent, may be given as follows:

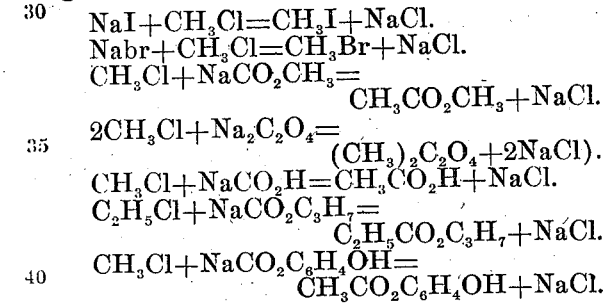

It will be noted that the methyl iodide and methyl bromide produced according to two of the equations just given are, in turn, among the examples of halogenated hydrocarbons of the aliphatic series given above, and thus may be reacted upon by a metallic salt of an acid in accordance with the process first stated to produce other esters of such character as are amenable to ready saponification, thus enabling alcohol to be produced.

The significance of this statement is that natural gas may be chlorinated to obtain a supply of methyl chloride, for example, and the methyl chloride thus obtained may react upon sodium iodide or sodium bromide, as the case may be, to produce methyl iodide or methyl bromide. The methyl iodide and the methyl bromide cannot be obtained directly from natural gas by any known method, but natural gas may be chlorinated and the iodides and bromides may then be prepared in accordance with the process set forth above, and these iodides and bromides may then be combined with metallic salts of acids in accordance with the process.

For example, methyl iodide and methyl bromide may be combined with sodium acetate in accordance with the process, the reactions occurring in accordance with the following equations:

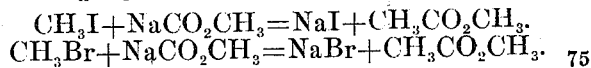
$CH_3Br+NaCO_2CH_3=NaBr+CH_3CO_2CH_3$.

It will be noted that dimethyl oxalate ($(CH_3)_2C_2O_4$) is obtained as a product when sodium oxalate ($Na_2C_2O_4$) is combined with methyl chloride. Saponification of the methyl oxalate may be more readily accomplished than saponification of methyl acetate; hence the materials here referred to may be favored where the producion of methyl alcohol is desired.

Where sodium formate ($NaCO_2H$) is combined with methyl chloride, for example, the product is methyl formate ($CH_3CO_2H$) and the by-product is common salt. The methyl formate can be saponified and alcohol produced by the use of an alkali in accordance with the method set forth above.

Where ethyl chloride ($C_2H_5Cl$) and sodium butyrate ($NaCO_2C_3H_7$) are employed in the reaction, the main product is ethyl butyrate ($C_2H_5CO_2C_3H_7$). This product is commonly known as oil of pineapple, and is valuable for flavoring purposes. It may be used, also, in the production of perfumes.

Where sodium salicylate ($NaCO_2C_6H_4OH$) is combined with methyl chloride, for example, methyl salicylate ($CH_3CO_2C_6H_4OH$) is the principal product. This product is commonly known as oil of wintergreen, and is valuable for flavoring purposes.

It may be stated that the common salt produced by these reactions is of a high degree of purity.

Various solvents may be employed in the practice of the process. Preferably one of the lower mono hydric alcohols of the aliphatic series, for example, methyl alcohol, ethyl alcohol, normal propyl alcohol or isobutyl alcohol is employed, where an alcohol is employed. As indicated above, the use of an alcohol involves fractional distillation to separate the product therefrom. On the other hand, as ester, such as methyl acetate or ethyl acetate, may be employed. For example, methyl acetate, which is the product obtained in the first reaction stated above, will serve as a solvent in the process substantially less well than ethyl or methyl alcohol but better than normal propyl alcohol or isobutyl alcohol. The use of methyl acetate does not require fractional distillation to separate it from the product which is being made, where such product is methyl acetate itself.

A ketone may be employed as a solvent, as, for example, acetone; also chlorinated hydrocarbons, such as carbon tetrachloride may be employed. Again glacial acetic acid or strong formic acid may be employed as a solvent, but it should be noted that such solvent is not usable where a salt of a weaker acid is to be employed in the practice of the process.

Ordinarily, it is desirable to have a considerable percentage of water present in the solvent, as it aids particularly in dissolving the salt employed, thus favoring the reaction.

Methyl or ethyl alcohol mixed with water constitutes the best solvent for the process. For example, methyl alcohol and water in equal proportions afford a well-balanced solvent adapted to dissolve large proportions of methyl chloride and sodium acetate and favoring a rapid reaction.

In the practice of the process, it is unnecessary to employ stirring apparatus, although such apparatus may be advantageously used, if desired. Also, if desired, where a gaseous form of halogenated hydrocarbon of the aliphatic series is employed, it may be caused to bubble through the solution in the autoclave or still as it is forced into the still to maintain the desired pressure, or maintain a sufficient amount of the halogenated hydrocarbon in solution to favor a rapid reaction.

While the pressure employed in the practice of the process may vary greatly, it is preferred to maintain a pressure of between fifteen pounds per square inch and three or four hundred pounds per square inch.

At room temperature, methyl chloride is a liquid at about 70 lbs, pressure and it is therefore convenient to introduce it as a liquid in the practice of the process.

A further example of reaction in accordance with the process may be stated in accordance with the following equation:

$$CH_2Cl_2 + 2NaCO_2CH_3 = 2NaCl + CH_2(CO_2CH_3)_2.$$

The methylene diacetate obtained in this reaction may be hydrolized, either by water or by water in the presence of ammonia, thus yielding formaldehyde in the first case or hexamethylenetetramine in the second case.

As indicated, formaldehyde and hexamethylenetetramine may be produced from the methyl acetate obtained by the process, according to well-known methods.

As indicated by the description given, the materials employed in the process may be present in varying proportions, but they will, nevertheless, unite, under the conditions set forth, in accordance with the proportions set forth in the equations given, to produce the esters set forth.

As indicated, the temperature may be varied. Within practical limits, the higher temperatures favor the reaction and shorten the time. It would be rarely desirable to employ a temperature substantially in excess of 150° C. or substantially lower than 100° C. for the most effective work. The expression 'at elevated temperature', as employed in certain claims, is to be understood as at least substantially as high as 100° C.

The foregoing detailed description has been given for clearness of understanding only and no unnecessary limitations should be understood therefrom, but the appended claims should be construed as broadly as permissible in view of the prior art.

What we regard as new, and desire to secure by Letters Patent, is—

1. The method of producing an ester which comprises causing a reaction, at elevated temperature, between a halogen derivative of natural gas and a metallic salt of an acid, in the presence of a solvent comprising alcohol.

2. The method of producing an ester which comprises causing a reaction, at elevated temperature, under pressure, between methyl chloride and a metallic salt of an acid, in the presence of a solvent.

3. The method of producing an ester which comprises causing a reaction, at elevated temperature, under pressure, between methyl chloride and a metallic salt of an organic acid, in the presence of an aqueous solvent.

4. The method of producing an ester which comprises causing a reaction, at elevated temperature, under pressure, between methyl chloride and a metallic salt of an aliphatic acid, in the presence of an aqueous solvent which comprises alcohol.

5. The method of producing an ester, which comprises causing a reaction, at elevated temperature, under pressure, between methyl chloride and a metallic salt of an aliphatic acid.

6. The method of producing an ester which comprises causing a reaction, at elevated temperature, under pressure, between methyl chloride and sodium acetate, in the presence of a solvent which comprises methyl alcohol.

7. The method of producing an ester which comprises causing a halogenated hydrocarbon of the aliphatic series to react upon a metallic salt in the presence of a solvent comprising alcohol and water, the water constituting substantially 50 per cent of the solvent.

8. The method of producing an ester which comprises causing a reaction, at elevated temperature, under pressure, between methyl chloride and a metallic salt of an acid, in the presence of a solvent comprising alcohol and water, the water constituting substantially 50 per cent of the solvent.

9. The method of producing an ester which comprises causing a reaction at elevated temperature, under pressure, between a halogenated methane having less than three halogen atoms and a metallic salt of an acid, in the presence of a solvent.

10. The method of producing an ester which comprises causing a reaction at elevated temperature, under pressure, between a halogenated methane having less than three halogen atoms and a metallic salt of an acid in the presence of a solvent which comprises methyl alcohol and water, the water constituting substantially 50 per cent of the solvent.

11. The method of producing an ester which comprises causing a reaction at elevated temperature, under pressure, between a mono-halogenated aliphatic hydrocarbon and a metallic salt of an acid, in the presence of an aqueous solvent.

CARNIE B. CARTER.
ALBERT E. COXE.